(12) United States Patent
McDonnell

(10) Patent No.: US 8,183,714 B2
(45) Date of Patent: May 22, 2012

(54) ELECTRIC POWER DISTRIBUTION METHODS AND APPARATUS

(76) Inventor: Alan McDonnell, Merrimack, NH (US)

( * ) Notice: Subject to any disclaimer, the term of this patent is extended or adjusted under 35 U.S.C. 154(b) by 94 days.

(21) Appl. No.: 12/519,507

(22) PCT Filed: Dec. 12, 2008

(86) PCT No.: PCT/US2008/086686
§ 371 (c)(1),
(2), (4) Date: Jun. 16, 2009

(87) PCT Pub. No.: WO2009/076640
PCT Pub. Date: Jun. 18, 2009

(65) Prior Publication Data
US 2010/0292853 A1 Nov. 18, 2010

Related U.S. Application Data

(60) Provisional application No. 60/996,954, filed on Dec. 12, 2007.

(51) Int. Cl.
*H02J 1/00* (2006.01)
*G05D 3/12* (2006.01)
*G05D 5/00* (2006.01)
(52) U.S. Cl. ............... 307/82; 700/287; 700/292
(58) Field of Classification Search ........ 307/82
See application file for complete search history.

(56) References Cited

U.S. PATENT DOCUMENTS 6,693,409 B2 2/2004 Lynch
(Continued)

FOREIGN PATENT DOCUMENTS

JP 2004-88900 3/2004

OTHER PUBLICATIONS

Mike Barnes, Real-World MicroGrids—An Overview 2007 IEEE, 8 pages.*
Mike Barnes et al., "Real-World Microgrids—An Overview", IEEE International Conference on System of Systems Engineering, pp. I-8, Apr. 2007.

(Continued)

*Primary Examiner* — Rexford N. Barnie
*Assistant Examiner* — Toan Vu
(74) *Attorney, Agent, or Firm* — Oppedahl Patent Law Firm LLC

(57) ABSTRACT

A plurality of end-user locations are served by a commercial utility grid. More than one and less than all of the end-user locations are themselves interconnected by a feeder, the feeder not metallically connected to the utility grid. The end-user locations each have a local AC bus that is not metallically connected to the utility grid or to the feeder, but that is linked by a coupler to both the utility grid and to the feeder. None of the local AC buses or the feeder is required to have the same phase or frequency as the utility grid. Locally generated electric power may be passed by means of the feeder to other end-user locations that are on the feeder. Each local AC bus has two or more inverters powering the bus.

15 Claims, 8 Drawing Sheets

U.S. PATENT DOCUMENTS

| | | |
|---|---|---|
| 7,016,793 B2 | 3/2006 | Ye et al. |
| 7,116,010 B2 | 10/2006 | Lasseter |
| 7,145,266 B2 | 12/2006 | Lynch |
| 2003/0025397 A1* | 2/2003 | Young et al. ............. 307/64 |
| 2006/0208571 A1* | 9/2006 | Fairlie ..................... 307/11 |
| 2007/0273211 A1 | 11/2007 | Wang et al. |
| 2009/0079266 A1 | 3/2009 | McNamara |
| 2009/0152951 A1 | 6/2009 | Algrain |

OTHER PUBLICATIONS

Robert Lasseter et al., "Integration of Distributed Energy Resources The CERTS MicroGrid Concept". Consortium for Electric Reliability Technology Solution, pp. 1-27, Apr. 2002.

International Search Report (PTC/ISA210) mailed Jul. 24, 2009.

* cited by examiner

Single Building Independent Grid DG Installation

Multiple Independent Grids with Un-Synchronized Feeder

US 8,183,714 B2

ELECTRIC POWER DISTRIBUTION METHODS AND APPARATUS

CROSS-REFERENCE TO RELATED APPLICATIONS

This patent application claims priority from U.S. application No. 60/996,954 filed Dec. 12, 2007, which application is hereby incorporated herein by reference for all purposes.

BACKGROUND

Much attention has been given in recent times to energy policy and energy conservation generally, and to electric power generation and transmission in particular. Traditional models for power generation and distribution may once have been the only workable ways to deliver power to end users. But a variety of factors including political events, rising energy costs, technological progress, and concern for the environment have drawn attention to the need for new paradigms and approaches.

It is apparent that one important goal is to make it possible to draw upon distributed energy resources as a source of electric power for end users. There are, however, a number of forces seemingly conspiring to limit or frustrate the use of distributed energy resources. One problem is that the operators of commercial power grids refuse to permit large amounts of power to be fed into the grid from end-user locations. Typically the operator of a commercial power grid will permit feeding of such power only up to a very small percentage of the distribution capacity of the grid. This means that if one end-user location happens to have a large amount of locally generated power available, it is likely to be difficult or impossible to use the commercial power grid as a way to distribute that power to other end user locations.

It would thus be very desirable if a workable approach could be found for passing large amounts of power from one end-user location to another, despite the lack of cooperation on the part of the operator of the commercial power grid.

As will be discussed in more detail below in connection with the invention, experience reveals that moving electric power from one part of an end-user location to another, or from one end-user location to another, in an efficient and reliable way, is not easy. Traditional ways of passing power from one grid to another have many drawbacks. In more recent times, inverters have been developed that convert DC to AC in an efficient fashion and with improved quality of alternating current. But the inverters, taken singly, do not serve the end users as well as might be desired.

It would be very helpful if an approach could be found for coordinating the frequency and phase of generated AC so as to avoid conflicts among the two or more inverters that might be connected to a given AC power bus.

Patents of possible background interest include U.S. Pat. No. 7,145,266 to Lynch, et alia entitled Parallel-connected inverters with separate controllers having impedance current regulators, U.S. Pat. No. 7,116,010 to Lasseter et alia, entitled Control of small distributed energy resources, and U.S. Pat. No. 6,693,409 to Lynch, et alia entitled Control system for a power converter and method of controlling operation of a power converter.

SUMMARY OF THE INVENTION

A plurality of end-user locations are served by a commercial utility grid. More than one and less than all of the end-user locations are themselves interconnected by a feeder, the feeder not metallically connected to the utility grid. The end-user locations each have a local AC bus that is not metallically connected to the utility grid or to the feeder, but that is linked by a coupler to both the utility grid and to the feeder. None of the local AC buses or the feeder is required to have the same phase or frequency as the utility grid. Locally generated electric power may be passed by means of the feeder to other end-user locations that are on the feeder. Each local AC bus has two or more inverters powering the bus. The inverters for a particular local AC bus are linked by out-of-band signaling with a latency far shorter than the period of the AC power, and at any given moment one of the inverters is a master and the others are slaves, so far as voltage, frequency, and phase are concerned. The DC buses powering the inverters are themselves isolated from each other. The linkage from each inverter to its AC bus is free from any transformer.

DESCRIPTION OF THE DRAWING

The invention will be described with respect to a drawing in several figures, of which.

Where possible, like reference numerals have been used among the figures to denote like elements.

DETAILED DESCRIPTION

Figure 1:
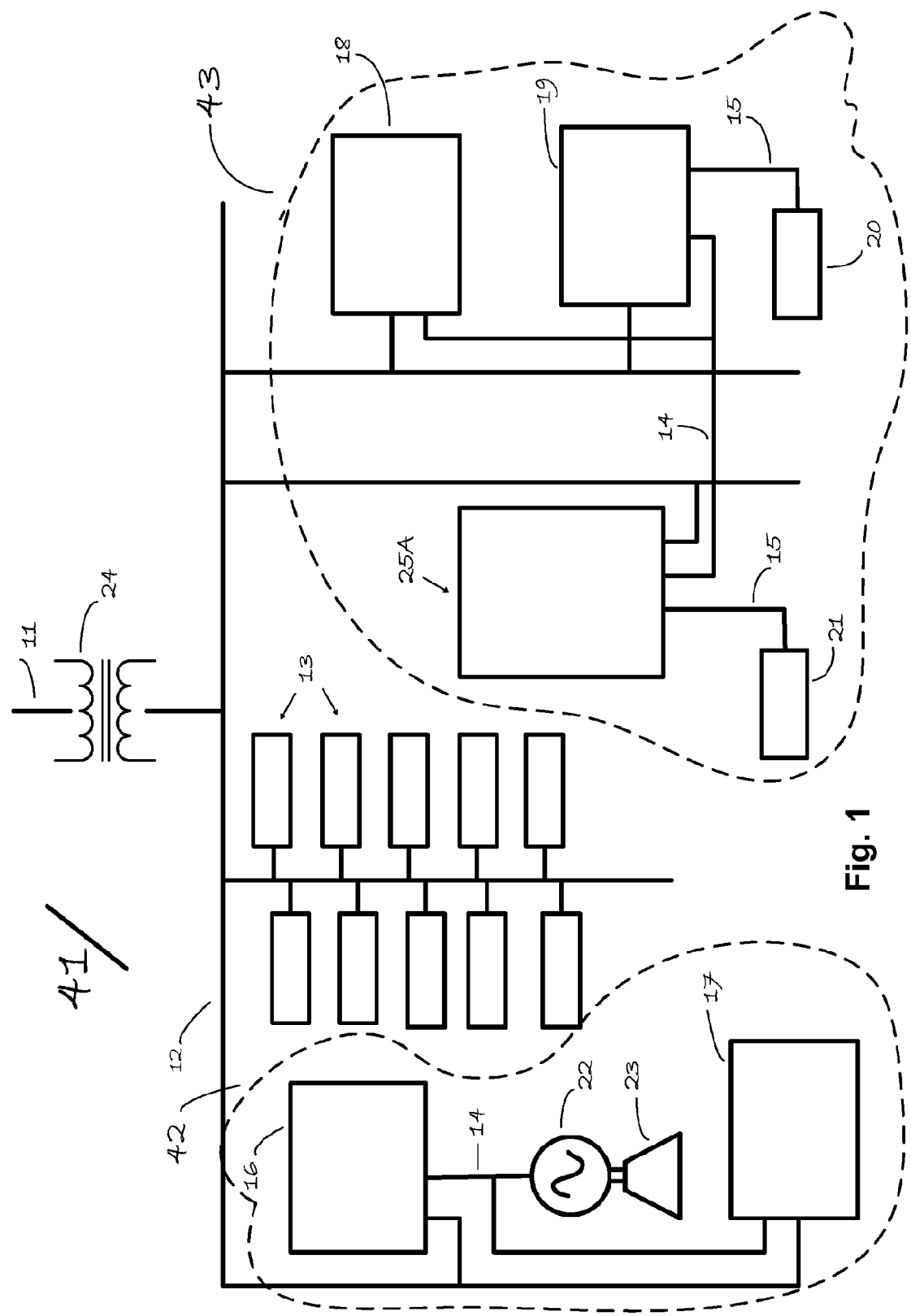
FIG. 1 shows a small-town distribution system.

FIG. 1 shows a small-town distribution system. In an exemplary embodiment, AC power is transmitted to the area by a utility company omitted for clarity in FIG. 1. The power is transmitted to the area by line 11 which may be 115 kilovolts (kV) three-phase AC power. This power is reduced in voltage at a substation 24 operated by the utility company for distribution on a distribution line or grid 12 which may carry 13 kV. This distribution grid is likewise three-phase AC power. Residences 13 are served by the distribution grid 12, as is a medium industrial plant 16, small industries 17, 18, and 19, a shopping mall 25A.

It may be that the utility company will place a strict limit on the amount of electrical power that any one customer or end user is permitted to generate locally under circumstances that might lead to power being fed back into the utility grid. Such a strict limit may in part be justified by legitimate engineering concerns, and may be in part caused by mindsets dating from earlier decades when all aspects of the utility grid were centrally planned and controlled.

Thus for example in a prior-art system, if the shopping mall 25A were to possess a source of on-site power 21, and if the connection of the on-site power through line 15 were such that power could be fed back into the utility grid 12, there might be strict limits on the permitted generation capacity of the on-site power 21. The limit may be only a small percentage of the power distribution capacity of the local grid 12. In such a prior-art environment, there are many social, environmental, and economic benefits that might have been available if only the on-site power 21 could have been larger in its power generation capacity than the capacity permitted by the utility or regulatory environment. Such social, environmental, and economic benefits are, however, completely forgone in a prior-art system.

In one embodiment 41 of the invention, feeders 14 are provided. Independent area 42 is defined by a respective feeder 14 which connects end-user locations 16 and 17. Note that the end-user locations 16 and 17 represent more than one but less than all of the end-user locations served by the utility, and represent more than one but less than all of the end-user locations served by the distribution grid 12. As will be described in more detail below, the presence of the feeder 14 permits a local distribution of power from an independent power plant 22, 23. The feeder 14 is not metallically linked to the distribution grid 12, and need not be operating at the same phase, or at the same frequency, as the power provided by the utility via grid 12.

Each end user 16, 17 has a respective local AC grid omitted for clarity in FIG. 1. At each local AC grid is a coupler coupling the grid 12 thereto, and a coupler coupling the feeder 14 thereto; the couplers are likewise omitted for clarity in FIG. 1.

Independent area 43 is also defined by a respective feeder 14 which connects end-user locations 25A, 19, and 18. Note that the end-user locations 25A, 19 and 18 represent more than one but less than all of the end-user locations served by the utility, and represent more than one but less than all of the end-user locations served by the distribution grid 12. As will be described in more detail below, the presence of the feeder 14 permits a local distribution of power from on-site power generators 20, 21. Just as was described in connection with independent area 42, the feeder 14 of independent area 43 is not metallically linked to the distribution grid 12, and need not be operating at the same phase, or at the same frequency, as the power provided by the utility via grid 12.

Each end user 25A, 19, 18 has a respective local AC grid omitted for clarity in FIG. 1. At each local AC grid is a coupler coupling the grid 12 thereto, and a coupler coupling the feeder 14 thereto; the couplers are likewise omitted for clarity in FIG. 1.

As will be described in more detail below, the embodiment 41 offers many benefits when compared with prior-art power distribution systems. A local power source 22, 23, 21, 20 can be of much greater power generation capacity than would be feasible in a prior-art system. Particular end users are able to enjoy greater reliability (e.g. up-time) with respect to the entirety of their energy needs, as compared with prior-art systems. The benefits that flow from generation of power locally to where it is needed, as compared with the legacy approach of generation power at great distances from where it is needed, may be fully enjoyed. The embodiment 41 may, under some circumstances, also permit an end-user to save money as compared with purchasing most of its power from the utility.

It will be appreciated that while many embodiments of a system such as that discussed in connection with FIG. 1 will be embodiments where the distribution grid 12 is operated and powered by a commercial electrical power utility, the teachings of the invention and its benefits are not limited thereto. For example, the grid 12 might be a grid operated by a military unit, perhaps up to the size of a division, in an isolated area such as a desert area.

The system 41 of FIG. 1 will now be described from a different perspective, namely that of an expanded power distribution system with several independent grids 14.

The architecture and control features of the independent grid 14 allow for an almost unlimited ability to expand and integrate with existing grids 12 as future growth desires.

The figure shows a small-town distribution system 41 that has been added to with small on-site power 21, 20 and larger independent power units 22, 23. The existing distribution system 12 could not support interconnection of these generators onto the distribution side of the transformer 24.

By adding the power converters and control scheme, the power can be integrated into the existing grid and supplied to the end users without the need for upgrades to the existing grid 12.

Further expansion could include larger independent grids or new ones connected through more power converters to the existing grid or to the other independent grids or both.

Figure 2:
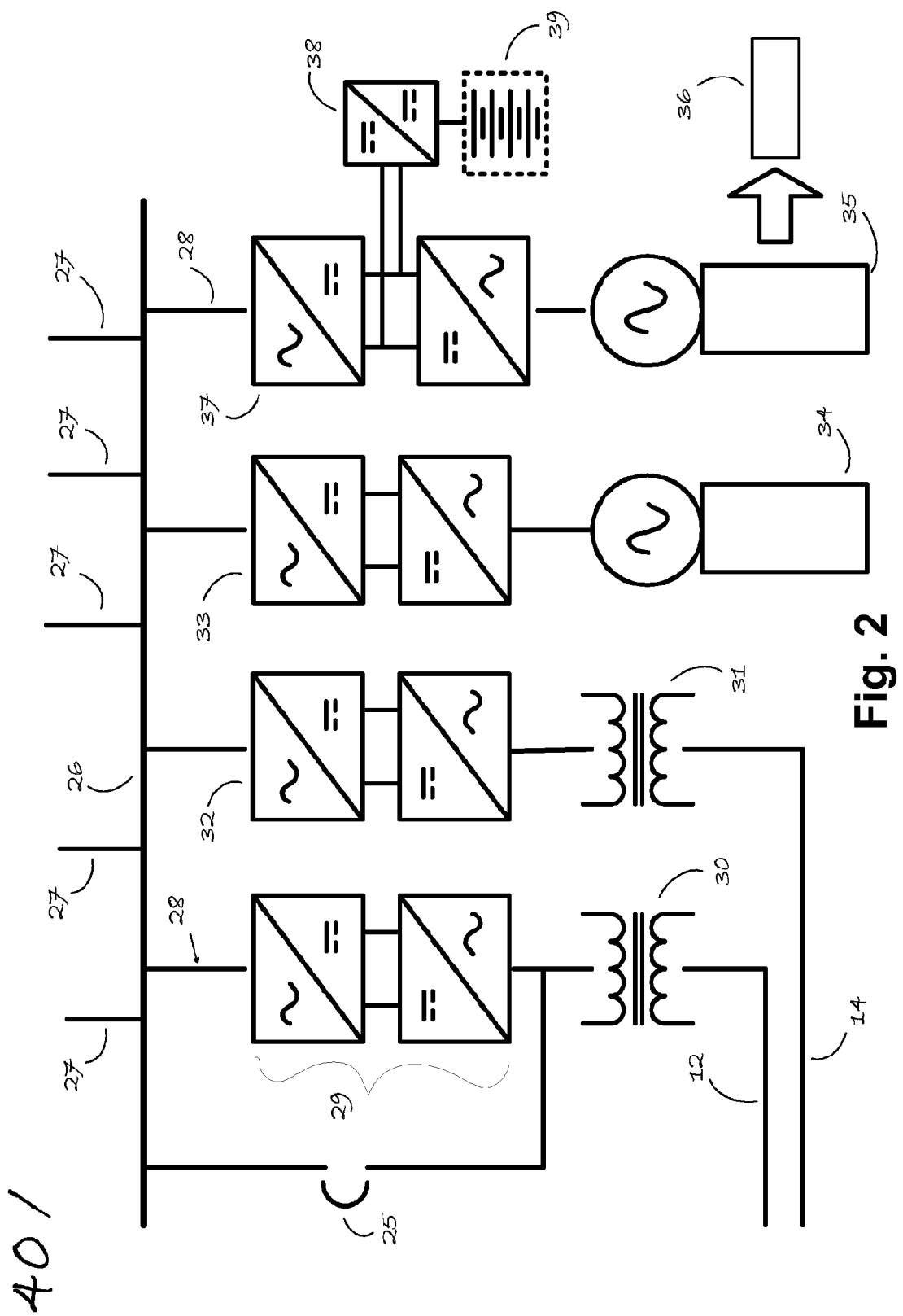
FIG. 2 shows a plurality of inverters powering a local AC bus.

FIG. 2 shows an end-user system 40. The end-user system may represent an entire building, or may represent a load-panel area within a large building. In some cases the end-user system 40 may represent a plurality of buildings nearby to each other.

The system 40 comprises a plurality of inverters 29, 32, 33, 37 powering a local AC bus 26. Each inverter has a line 28 connecting to the bus 26. The bus 26 has local loads 27.

The system 40 receives utility power from line 12, which may be stepped down locally by means of transformer 30. For example the utility may provide 13 kV on the line 12, stepped down to three-phase 480 V AC by means of the transformer.

In day-to-day operation, the 480 VAC power from the utility is coupled by means of coupler 29 to local AC bus 26, and thence to local loads 27.

Importantly, however, there may be one or more local power generation or storage devices forming part of system 40. As one example there may be an engine and generator or alternator 34, generating AC power which is coupled by coupler 33 to the local bus 26. Importantly this power source 34 can be very large, much larger than what would be permitted in a prior-art system. A portion of the power (the portion permitted by the utility) can be fed back into the grid 12 by means of coupler 29.

What will also be appreciated is that spare power in the local bus 26 can also be fed into feeder 14 to be made available to other end users. This takes place through coupler 32 and optional transformer 31, which may for example step up locally generated power at 480VC to a 13 kV level which is more suitable to distribution to the other end users, who might be a kilometer distant. (The higher voltage reduces resistive losses in the feeder.) The amount of power that can be shared from one end-user location to the next (using feeder 14) is far, far greater than the amount of power that could be shared if the only sharing mechanism were that of the utility grid 12. It is difficult to overstate the benefit of what has just been said about the feeder 14 when compared with a prior-art system where the only sharing opportunity is the legacy grid 12 operated by a legacy utility that may be suspicious of end users who wish to generate large amounts of power locally.

In FIG. 2 we see examples of other equipment that might be interconnected with the local bus 26. For example a DC storage system 38, 39 permits storing DC energy received from the local bus 26, or storing DC energy received from generation facility 35. Generation facility 35 may be a cogeneration facility providing waste heat to some other process while generating power to be delivered to the local bus 26 (and/or to storage 38, 39).

Stated differently, FIG. 2 shows a proposed building power distribution system 40, which has been made into an independent grid 26, unsynchronized with the main existing grid 12. There is power coming from two different, unsynchronized external feeds 12, 14, as well as two onsite generators 34, 35 and incorporating energy storage 38, 39 in one of them.

The inverters 29, 32, 33, 37 are controlled in such as way as to feed the 480VAC main (local) bus 26. In this way isolated, independent DC sources are made to behave like a single, larger voltage source feeding the bus 26.

Separate system controls allow for the net energy supply to be varied between the isolated units 29, 32, 33, 37 to allow for more economic control of energy sources and to improve redundancy.

In the above arrangement, the DC link voltages of the various inverters 29, 32, 33, 37 are not connected together. This increases redundancy since the failure of a single DC link will not cause the failure of any of the others.

It will be appreciated that while many embodiments of a system such as that discussed in connection with FIG. 2 will be embodiments where the local AC bus is a three-phase "wye" grid, the teachings of the invention and its benefits are not limited thereto. For example, the local C bus grid 12 might be a single-phase AC bus, or might be a "delta" three-phase system.

In the event of failure of the system 40, it is possible to restore service to the local bus 26 by opening breakers 28 and closing a bypass or transfer switch 25. In an exemplary embodiment, these steps are carried out manually, and it is anticipated that these steps would be required only very infrequently.

In a system of which FIG. 2 is an example, there is no limit to the number of different power sources. While FIG. 2 shows four possible power sources, there could be more. Typically there would be N+1 or N+2 redundancy. The internal building loads 27 are the same as they would be for a standard utility power distribution layout.

The key to controlling the layout 41 of FIG. 2 is that all the inverters 29, 32, 33, 37 that are tied to the main AC bus 26 must share the load 27.

One embodiment being described herein is a power system which includes a utility grid providing AC electric power connectivity and extending geographically to a plurality of first end-user locations and to a plurality of second end-user locations. The first end-user locations comprise more than one and less than all of the end-user locations of the utility grid. Each of the first end-user locations comprises a local bus providing AC electric power connectivity. Each local bus has associated with it at least one AC load metallically connected thereto and drawing power therefrom. Each local bus is coupled by means of a respective first at least one coupler to the utility grid.

The at least one coupler comprises a first power-supply-inverter and a second power-supply-inverter, each power-supply-inverter having an AC interface and a DC interface and a controller. Each power-supply-inverter is disposed in a first mode to receive DC power received at the DC interface and to generate AC power delivered at the AC interface, and is disposed in a second mode to receive AC power received at the AC interface and to generate DC power delivered at the DC interface. The DC interface of the first power-supply-inverter is electrically connected to the DC interface of the second power-supply-inverter.

The at least one coupler has a first AC interface defined as the AC interface of the first power-supply-inverter and a second AC interface defined as the AC interface of the second power-supply-inverter. The controller of the first power-supply-inverter and the controller of the second power-supply-inverter coupled so as to prevent the first power-supply-inverter and the second power-supply-inverter from being in the first mode simultaneously for extended intervals, and so as to prevent the first power-supply-inverter and the second power-supply-inverter from being in the second mode simultaneously for extended intervals. By "extended intervals" we may mean in excess of a few milliseconds or in excess of half a second.

Each power-supply-inverter is disposed when in its first mode to generate its AC power delivered at its AC interface consistent in voltage and phase and frequency with any AC power present external to said AC interface.

Figure 3:
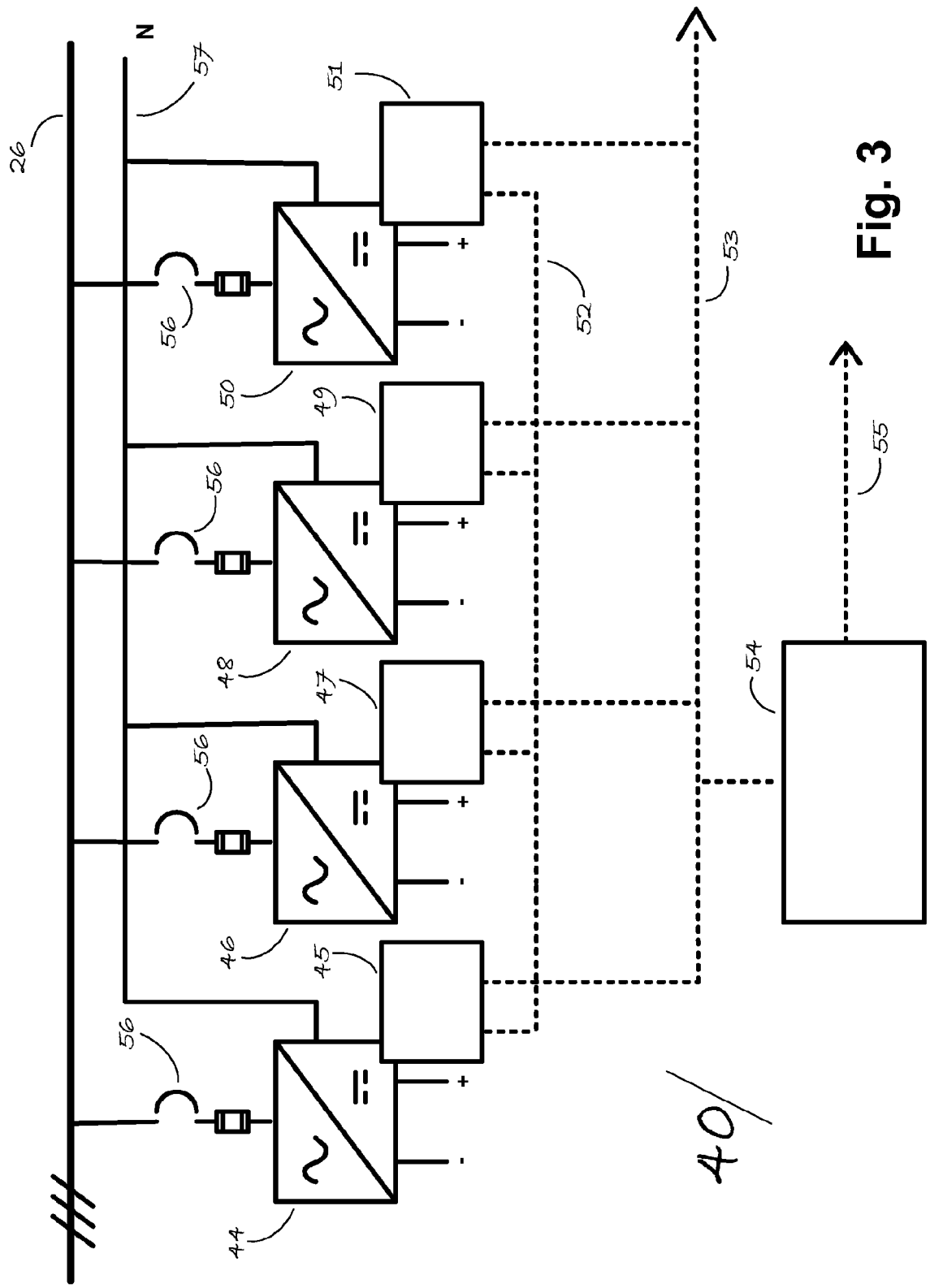
FIG. 3 shows a detail of a bank of inverters, with particular attention to out-of-band control links.

FIG. 3 shows a detail of a bank of inverters 44, 46, 48, 50, with particular attention to out-of-band control links 52, 53.

FIG. 3 is intended to portray a basic power layout, ignoring for the moment the source of DC power to the inverters. In this embodiment the AC grid (local bus) 26 is a four-wire system with Neutral line 57, fed directly by the inverters 44, 46, 48, 50 without a transformer downstream of them (between the inverter and the local bus 26).

It will be appreciated that a control scheme is required such that all of the inverters that are sourcing both kW and kVAR current into the same voltage node (here, the local bus 26) will work together and not fight each other for control. The control scheme used in this system to solve this problem works by having one unit, called the master, maintain the voltage of the four-wire 480/277VAC bus. Its individual phase currents are measured and the values passed along a high speed communication link 52 to the slave units to be copied. For example at a particular moment, the master might be inverter 46 having respective controller 47, while the other controllers 45, 49, 51 are acting as slaves, each controlling its respective inverter 44, 48, 50.

Each individual inverter 44, 46, 48, 50 still maintains overcurrent and other protection features, and a main breaker 56 can be remotely tripped by the system or inverter controller under certain conditions.

A standard prior-art way of paralleling a group of synchronous rotating generators gives oscillations because they are trying to share power and speed but can only be controlled by a mechanical fuel throttle that has a slow reaction time between throttle change and output power change. There are no power electronics in such a system. The power electronic converters of the present embodiments can change power at least 500 to 1000 times faster.

The method for providing maximum fault current as fast as possible involves the use of measured voltage limits by each individual inverter, such that if a voltage is out of range due to a fault, the maximum amount of current is sourced by each unit for as long as possible or until the fault is cleared.

The fault current must be sourced to open a distribution breaker. This is a difficult inverter challenge while being controlled in a current-sharing manner. See FIG. 5 which shows an internal power circuit 73 for a building. Within the building is a 480 VAC main bus 71. Branch feeders 72, 74, 76, 78 deliver AC power to circuits throughout the building. Independent 800 VDC supplies 81, 82, 83, and 84 are shown, each able to deliver AC power to the main bus 71.

Consider what happens if there is a fault 85 giving rise to a fault current 86. The inverters 81, 82, 83, 84 must be able collectively to source enough fault current to open the protection on the faulted feeder without taking down the whole independent grid.

One of the biggest limitations of inverter based microgrids is their inability to be retro-fitted to existing buildings without completely re-doing the breaker scheme because the inverters cannot source enough fault current to trip a breaker. Thus the inverters will trip off (instead of a breaker being tripped) and the whole building goes dark, because the inverters have tripped off. This contrasts with a simpler prior-art system in which a fault current would have blasted open the breaker of one of the branch feeders and the rest of the building would have stayed on.

With a single, low impedance voltage source it is a simple calculation to determine how much fault current can be sourced versus how much is needed for certain breakers. If the breaker is too big for the inverter (that is, if the tripping current for the breaker exceeds the current-sourcing capability of the inverter), then the breaker needs to have intelligent fault sensing controls added, or else the problem of the whole building going dark comes back.

With parallel inverters, what is needed is for the inverters to act more quickly than they could in a simple current-following mode. In an exemplary embodiment, the inverters are configured to sense a fault through voltage sensing, and then each inverter is released to feed maximum current until the voltage comes back, which happens after the breaker feeding the fault opens.

Figure 5:
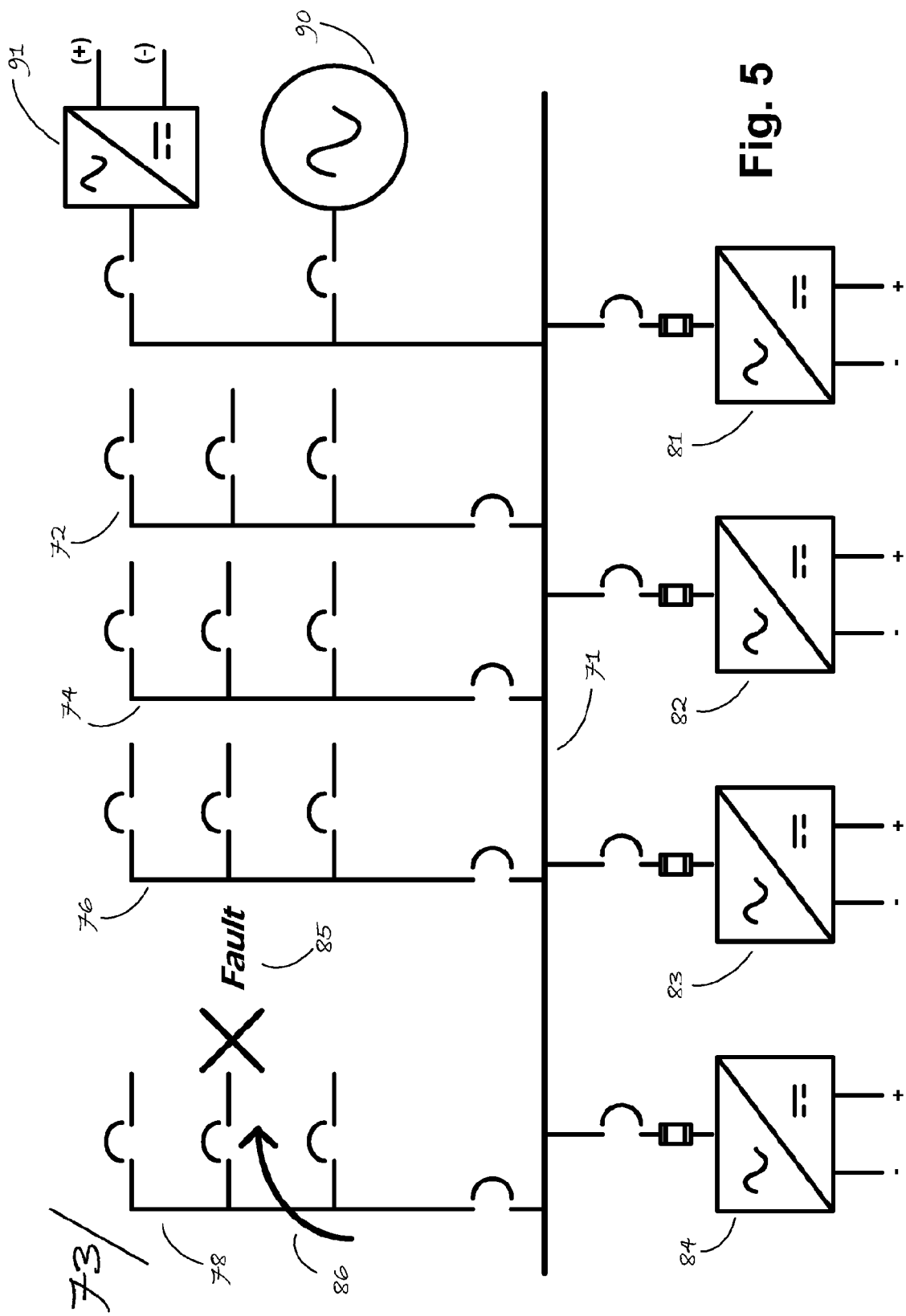
FIG. 5 shows an internal power circuit for a building.

FIG. 5 also shows optional power sources 90, 91 which may provide AC power to the AC bus 71. For example an inverter 91 may receive power from (say) a photovoltaic array. Induction generator 90 may receive power from a source of rotary energy such as a turbine. As will be discussed further below, each of these sources is necessarily synchronous to whatever voltage source defines the AC voltage on the AC bus 71. Here, the voltage source is the one or more inverters 81, 82, 83, 84. What may happen, and what is in fact not uncommon, is that the power from one or more of these sources may be of poor quality. The source may only deliver power to one phase. Even if the source delivers power to all three phases, it may not be in perfect phase relationship. Loads that are assymmetric (as between the three phases) or that introduce power-factor loads may be present on the AC bus 71, and if they do, this may be beyond the ability of the sources 90, 91 to correct or compensate for. As will be discussed below, however, with suitable configuration the inverters 81, 82, 83, 84 can sample the voltage waveforms present on the three phases, and can nearly instantaneously deliver voltage to the phases in such a way as to overcome nearly all such problems. In this way, an end user of a system 73 can make use of commercial, off-the-shelf power sources even if they produce power of poor non-utility-grade quality. In an exemplary embodiment, the combined power generation capacity of the non-utility-grade sources 90, 91 might be up to fifty percent of the combined power generation capacity of the inverters 81, 82, 83, 84. In another embodiment the percentage might be sixty-five percent.

Figure 4:
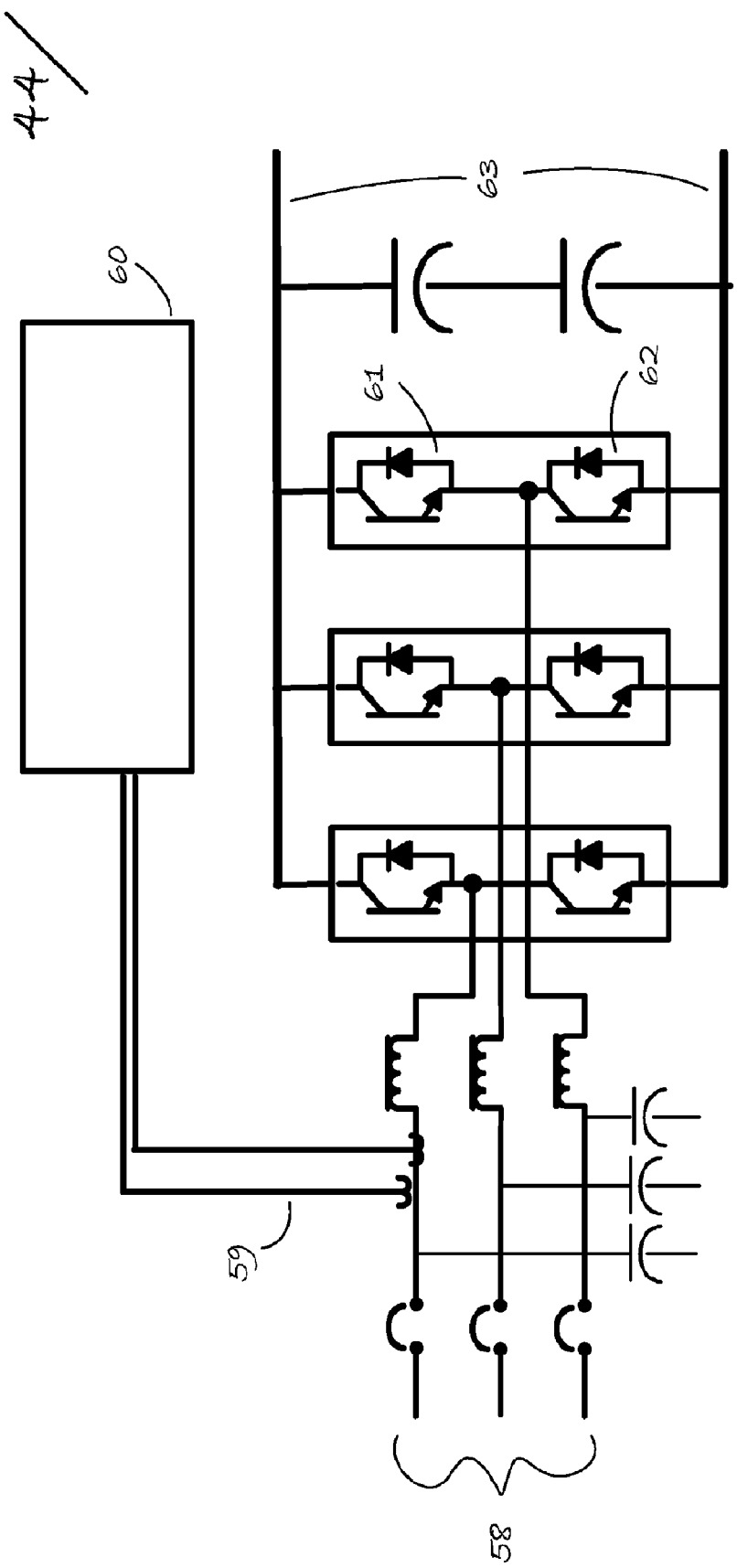
FIG. 4 shows detail of an inverter.

To recap, in the layout of FIG. 4 above, the DC link voltages of the various inverters are not connected together. This helps reduce fault current levels and increases redundancy. The output AC inverters are still able to work together as a single unit voltage source by having the transistor PWM (pulse-width modulation) pattern sent from a master controller (one of 45, 47, 49, 51) and passed through to the slave controller (the others of 45, 47, 49, 51) of each individual inverter control.

The Master PWM Controller acts as it would act if it were driving a single inverter, adjusting the PWM pattern to maintain a fixed voltage and frequency no matter what the load. This can include adjusting the PWM pattern to compensate for non-linear load characteristics that would otherwise cause voltage distortion, thus actively filtering harmonic currents.

To take advantage of price differentials at different times for different sources of energy, it is necessary to control how much of each energy source supplies the load. In the exemplary control scheme the power flow can be controlled accordingly.

Corrected elsewhere, the DC voltage will now stay stable and the power flow change will be done by each slave inverter varying its PWM pattern based on the current slave signal multiplied by (x) a proportioning signal coming from the CanBUS. Note that this may include a proportion greater than 100%, which will cause the slave to supply more power than the master.

It is instructive to return briefly to FIG. 2 for a description of the distributed generation control strategies.

The energy sources for the on-site power 34, 35 can come from many different sources, but the most common are the burning of natural gas or syngas, the use of variable speed engine generators or turbines, the use of fuel cells, and the use of solar power. Many of these sources require DC/AC conversion.

In addition, energy storage technologies 38, 39 can help balance power in the grid, smooth the peak generation requirements, and provide short-term power during loss of other generation sources.

The power electronics and control scheme can take advantage of the ability to run rotating machinery at variable speeds and convert the electric power. Importantly, in a typical prior-art system, any rotating-machinery power source such as a generator or alternator is required to run at some fixed fraction or multiple of the frequency of the local bus, and is required to maintain a fixed phase relationship with the local bus. But in the approach of FIG. 2, a power source drawing upon rotating machinery is able to serve its purpose even if the rotation is at some frequency and phase that is not linked to anything about the local bus. Saying this in a different way, there is no requirement that the rotating machinery be rotating at any particular frequency, to be able to generate power to be supplied to the local bus 26.

The approach according to the invention is thus a much more efficient approach than the standard prior-art way of generating fixed-frequency electric power from rotating generators, especially over wide power ranges which are more necessary with smaller grids.

Similarly if a gas or steam turbine generator is used with a system according to the invention, it becomes possible to eliminate a gearbox. This decreases size and allows variable speeds, which increases efficiency. Size and weight issues can be particularly important in dense areas where construction space is limited.

Returning to FIG. 3, it is noted that the DC/AC or DC/DC inverters shown each have a CanBUS connection 53 and a dedicated high-speed link 52 as shown.

The main redundant feature of the inverter controls is to be able to keep running if one unit fails. If the master unit fails, the next slave unit down the line becomes the master and continues on. So for example, if controller 47 is the master and if the other controllers are slaves, a provision must be made for the possibility that the controller 47 (or its inverter 46) may fail. In that case, an arbitration mechanism is employed to promote one of the other controllers 45, 49, 51 to "master" status.

A series of alarm and warning messages can be sent via ETHERNET 55 over the internet to remote monitoring facilities. This enables remote diagnostic capabilities and the ability to more quickly dispatch necessary maintenance support.

Under this arrangement according to the invention, since any single inverter or energy source can fail without causing complete grid failure, then the faster the failure can be fixed, the less the chance of a grid failure due to a second equipment failure.

Depending upon the particular grid and design and cost considerations, it may be required that the grid run at a reduced load until repairs can be completed. This may be carried out using demand response signals from the system level controller 54 to an intelligent load shedding control, but done in such a way that the AC voltage on the grid always stays within specification.

In the event of a failure of the system level controller 54, the inverters 44, 46, 48, 50 are programmed to go into a default mode and keep supplying the grid with balanced or pre-set proportions from the various energy sources. An alarm will be sent via ETHERNET 55 or simply the absence of the required signal will trigger an alarm upstream. Again, this is done seamlessly.

These features cover all the significant faults that could stop the independent grid 26 from providing voltage within the specified limits under any single point of failure.

The final redundant feature is the ability to switch the whole system off and go to a bypass switch (25 in FIG. 2) to feed the load just as a traditional distribution system does. This would normally be done manually for safety reasons.

The bypass feature is easy to integrate because the independent grid is designed to integrate into existing grids with very few changes required.

A system control scheme for a single independent grid will now be described.

To both balance thermal energy requirements and take advantage of price differentials at different times for different sources of energy, it is necessary to control how much of each energy source supplies the load at a given moment.

In the control scheme according to an embodiment of the invention, this is done by sending a mathematical multiplier to each inverter 44, 46, 48, 50 via CanBUS 53, such that it can be multiplied inside the slave units to the proportioning signals coming from whichever inverter is serving as the master inverter at that time.

Two-way communication via CanBUS 53 is used to adjust the amount of energy from different sources in the event of an inverter failure. The inverters will automatically re-assign master control to the next slave unit, but the total amount of energy fed to the independent grid must be maintained.

The system may also include intelligent switchgear on certain loads to enable fast load shedding of less critical loads in the event of disruptions from an energy source causing total load capacity problems.

The communication to a central station for optimizing energy use and monitoring system conditions is done via ETHERNET link 55 to the internet.

As may be appreciated from the above discussion, what is described includes the application of a control scheme to control multiple inverters in order to drive an independent electrical grid fed by multiple energy sources, controlling the energy flow from the various sources, along with redundant back-up capabilities.

A main purpose behind creating such a control scheme is to facilitate the efficient integration of distributed energy resources (DER) into the existing power grid, without being limited to existing penetration level limits imposed by operators of the existing grid. This ability to integrate unlimited amounts of various sources of electrical energy, without regard to the present state of the existing grid, is at the heart of the need for this technology application.

The main way in which this task is accomplished is by having the Independent Grid (feeder 14) be seen by the main grid 12 as a load-reduction type device, as opposed to a parallel interconnected generator.

For projects requiring capacity larger than a single grid can support, the independent grids 14 are capable of being interconnected with other independent grids, for unlimited expandability.

The system provides for the independent grid and the efficient use of distributed generation assets, while overcoming the main challenges of integration with respect to control and stability of the existing grid.

Additional control features to improve redundant capability. The Multiple Inverter Control Scheme can include a redundant, always on-line, back up PWM generator controller. If the Master PWM healthy signal is lost, the voltage source inverters can switch to the backup without interruption or delay.

There are other software features to command the voltage source inverters and energy source converters to behave in certain ways under certain conditions to prevent complete system trips. The system may also include intelligent switchgear on certain loads to enable fast load shedding of less critical loads in the event of disruptions from an energy source causing total load capacity problems.

Upstream grid fault current limiting. In a Distributed Generation application with the inverter tied in parallel to a larger grid, the path of power flow during an upstream grid fault is difficult to predict.

The main grid operator will want to shut down all connected distributed generation sources as quickly as possible so that the existing protection breakers do not see an increase in the amount of fault current that they must interrupt.

By simply measuring current, the inverter controller cannot tell that such an upstream fault has occurred due to the various loads (such as induction motors) and other generation sources which may create resonant circulating paths for the current. The only way to sense an upstream fault is through voltage measurement and comparison between the phases.

The inverter controller can be programmed to measure such anomalies and shut down on the next 200-microsecond transistor switch. The controller must have the capability to filter noise from the measurements such that it does not trip on nuisance events.

High Speed current control/power flow control. As noted above, with the inverter switching 40+ times per half cycle, the ability to control current is much faster than any other means of standard electrical controls.

The inverter controller monitors the AC voltage and switches ON and OFF the transistors to create current flow. The controller monitors the feedback of the current sensor and can adjust the switching of the transistors for both amplitude and phase angle of the current relative to the voltage.

The control bandwidth is a function of the transistor switching frequency, with the feedback sampling frequency at a higher rate for improved accuracy.

When the inverter is tied to an infinite grid, it is always in current control mode. If the grid is unstable, the inverter can help stabilize it by monitoring the frequency and voltage and adjusting real or reactive current, or both, as required.

The inverter will have some inherent harmonic compensation for the main grid due to the low source impedance of the current source. Active harmonic filtering through current control of AC voltages measured at multiple frequencies of the fundamental can be incorporated, but this is a significant extra feature and will require switching frequencies higher than 5 kHz for harmonics beyond 5th and 7th.

Output AC voltage source operating mode. If the inverter is NOT connected to an existing infinite grid, it can act as the voltage source. In this mode it will turn the transistors ON and OFF and measure the output voltage, adjusting to keep an accurate 60 Hz 480V sinusoidal waveform. The current draw will be dependent upon the load, with the current sensors acting as protection devices. The inverter may be programmed to lower the output voltage under heavy current draw if desired.

The inverters can be placed in parallel to increase the capacity of the overall output. With special controls, multiple inverters can be grouped together to act as one, even though the DC link sources are not connected together.

FIG. 4 shows detail of an inverter.

The diagram shows a simple circuit of 6 transistors including 61, 62 connected in 3 series pairs between a DC supply 63 through an inductor to an AC line 58. The output AC current and voltage are measured on lines 59 and fed back to the inverter controller 60. Thus there is current and voltage feedback as to all 3 phases of the AC line.

The basic concept of the power flow control is that either the top transistor 61 or bottom one 62 is switched ON (depending upon the AC waveform polarity at the time) to create a path from the AC voltage through the inductor to the + or − DC link, causing current to flow and energy to be stored in the magnetic field of the inductor.

When this transistor turns OFF, the energy stored will be dumped through the freewheel diode of the opposite transistor into the DC link capacitors.

The timing of the transistor firing can be manipulated such that the amplitude of the current and phase angle of the voltage and current can be controlled. This allows for separate real and reactive current control, current limits and with 180 degree phase shifts, the direction of the net power flow.

Fast Response. Due to the switching frequency of the transistors (5 kHz), changes can be made every 200 uSeconds, or 41.5 times in each half cycle (at 60 Hz).

Figure 6:
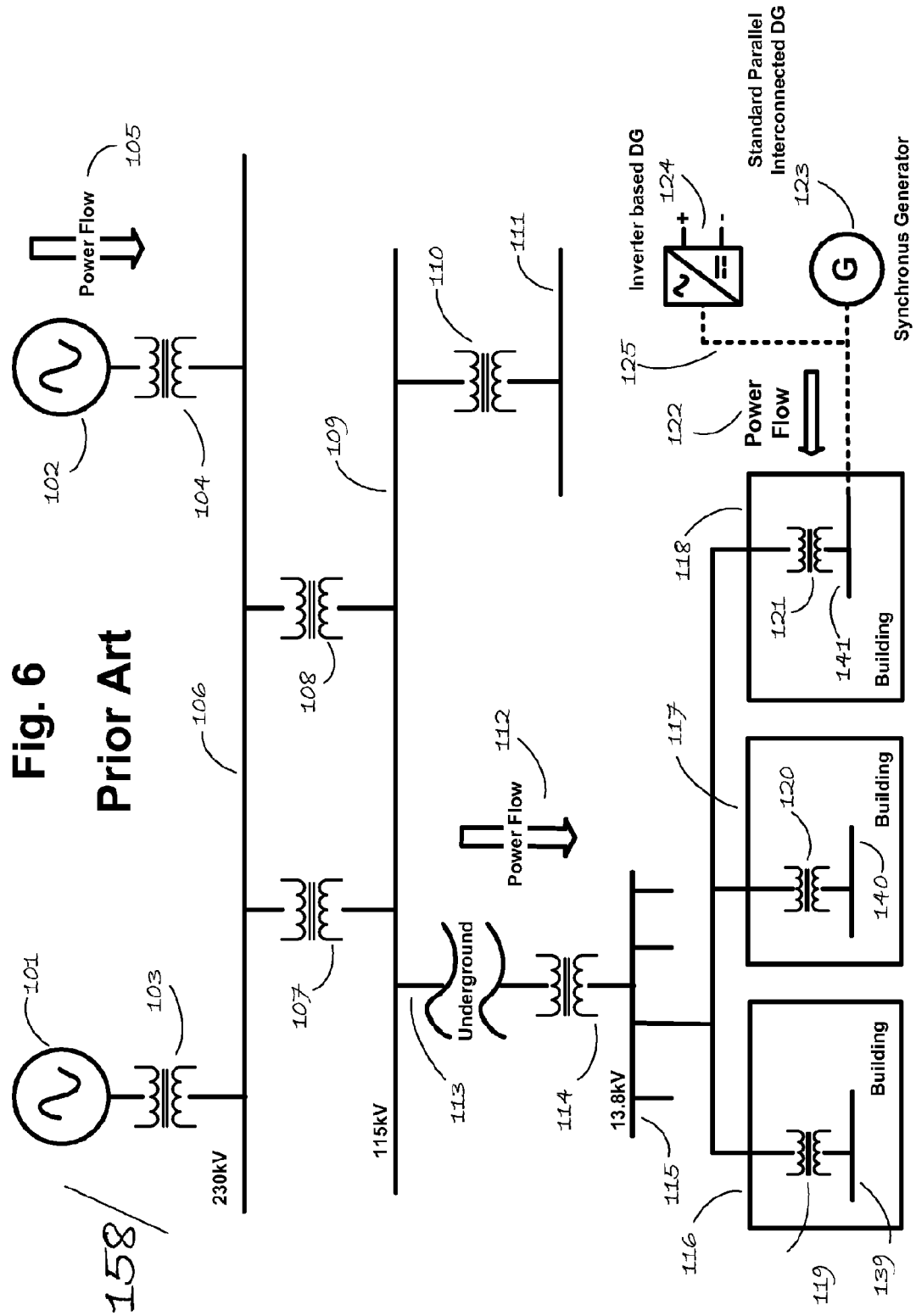
FIG. 6 shows a prior-art standard interconnection.

FIG. 6 shows a prior-art standard interconnection. Power is generated by a utility company at generators 101, 102, each linked by a transformer 103, 104 to a 230 kilovolt (for example) transmission line 106. This is stepped down by transformers 107, 108 to a 115 kilovolt transmission line 109. This power may be stepped down by a transformer 110 to a 13.8 kilovolt distribution line 111. The power may also be stepped down by a transformer 114 to a 13.8 kilovolt distribution line 115. The transmission lines may be any of several voltages including 230 kV or 345 kV or 500 kV.

Distribution line 115 may serve buildings 116, 117, and 118, each having a respective transformer 119, 120, 121. Within each building is a respective AC power bus 139, 140, 141.

A single building 118 may have a generator 123 and an inverter-based local source of generated power 124. AC power from these sources is carried to the building 118 by means of a bus 125. As will be appreciated from the above discussion, the regulatory environment will typically place a strict and low limit on the amount of power that may be passed from bus 125 back into the utility grid at 115, 109, and so on.

Importantly, the transformer connections are each, by definition, synchronous as between the primary and secondary windings thereof. This means that the generator 123 is strictly required to be synchronous with the utility grid and with the utility generators 101, 102. Likewise the inverter 125 is strictly required to be synchronous with the utility grid and with the utility generators 101, 102.

Figure 7:
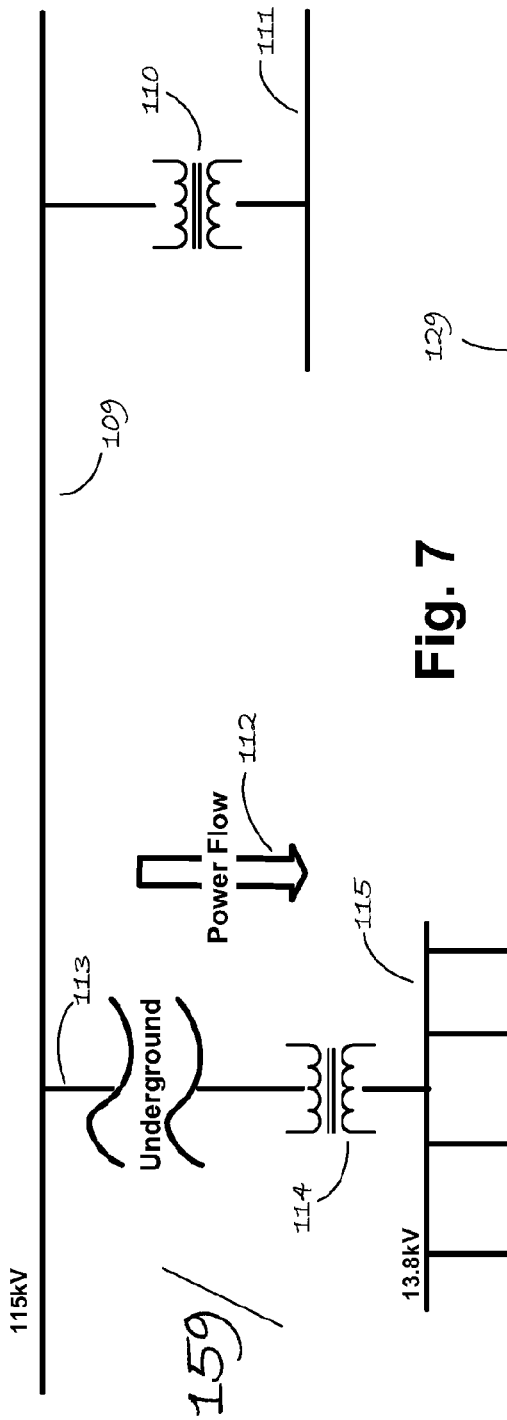
FIG. 7 shows an installation with an independent grid for a single building.
Figure 7:
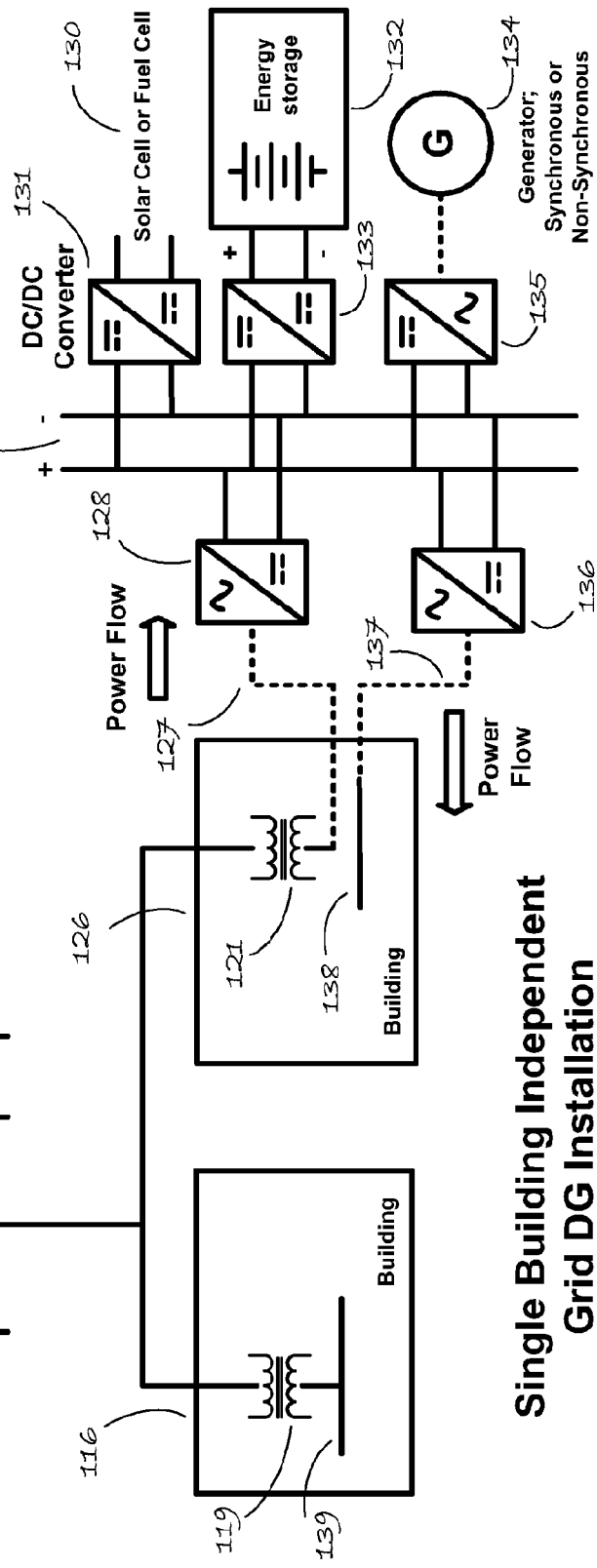

FIG. 7 shows an installation with an independent grid for a single building 126. The 115 kilovolt transmission line 109 is seen, just as in FIG. 6. Distribution line 115 is seen, as in FIG. 6. Building 129 functions as in FIG. 6. Importantly, however, in FIG. 7 it may be seen that building 126 is quite different. Utility power is passed through transformer 121 to line 127, where it is rectified at 128 and provided to DC bus 129. In this example a power source 130 provides power to a DC/DC converter 131 to the DC bus 129. Also in this example a bidirectional DC/DC converter 133 connects a DC energy storage device 132 with the DC bus 129. The energy storage device 132 might, for example, be a battery.

What is important here is that the direction of the power flow is FROM the grid not TO the grid, thus the independent grid is not seen by the existing grid as a generator but as a load, and in this case, a reduced load, due to the on-site generators providing much of the energy required for the building.

A generator 134 provides power to rectifier 135, and from there to the DC bus 129. The DC power at the DC bus 129 is inverted at 126 and is provided via line 137 to internal AC bus 138 to power loads in the building 126.

Importantly, it will be appreciated that there is no requirement that the generator 134 be synchronous with anything else.

Figure 8:
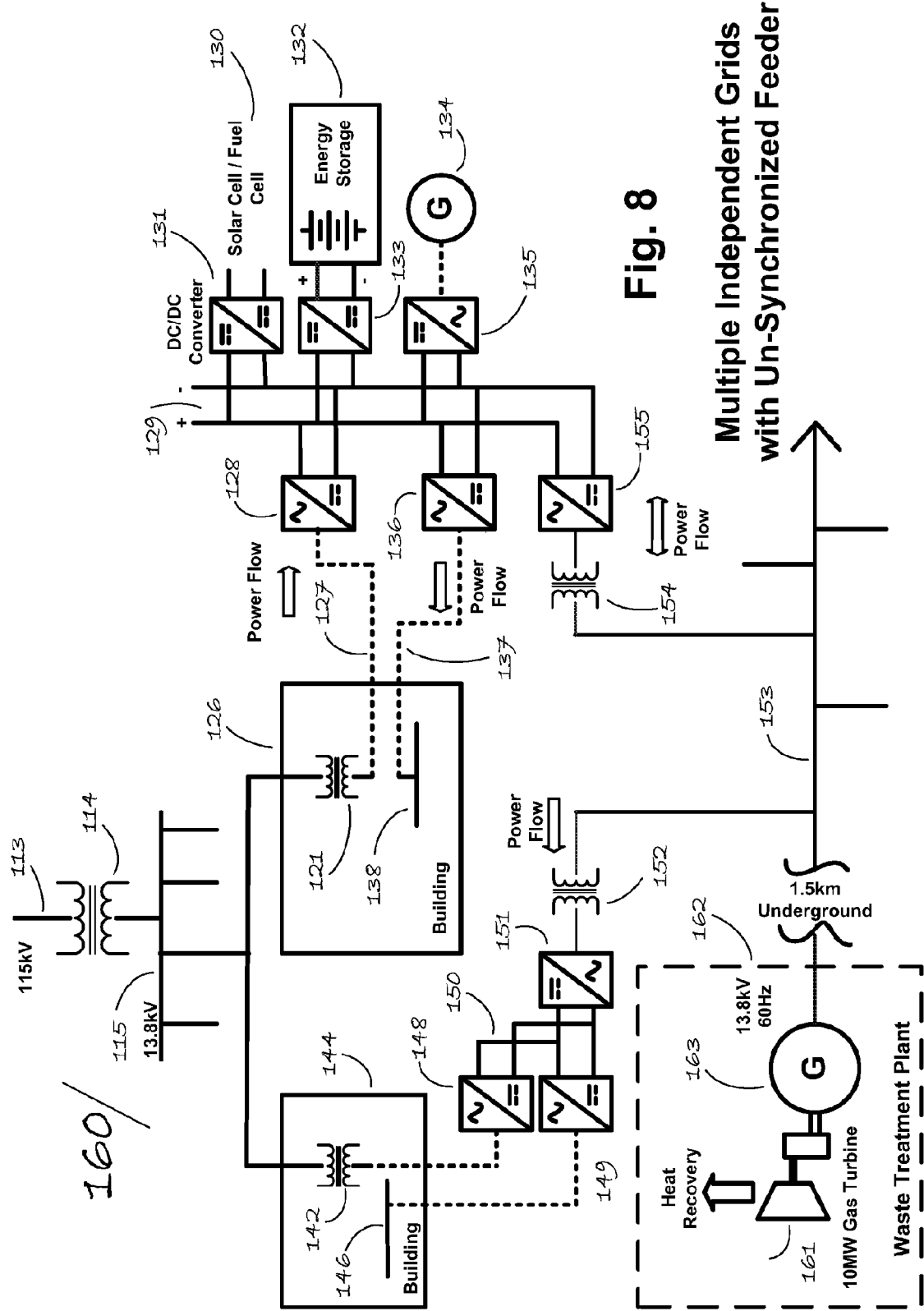
FIG. 8 shows an installation with multiple independent grids, as well as an unsynchronized feeder.

FIG. 8 shows an installation 160 with multiple independent grids, as well as an unsynchronized feeder 153. FIG. 8 shows many of the same functional blocks as FIG. 7. New functional blocks in FIG. 8 include coupler 155 which couples the DC bus 129 with the feeder 153 (perhaps through a transformer 154 as shown). Building 144, line building 126, has an internal bus 146 that is not tied metallically to the building feed at 142. In this way building 144 is similar to building 126, which likewise has an internal bus 138 that is not tied metallically to the building feed at 121.

Note that in an exemplary embodiment, the feeder is a distribution level voltage, 13.8 kV. The power conversions take place at 480V, but any distance will be required to have 13.8 kV lines. Note that this is also the highest voltage that can be used with the generator, in this case a 10 MW turbine.

Associated with building 144 is a local DC bus 150, much as building 126 has associated with it a local DC bus 129. This permits building 144 to draw power from the feeder 153 as desired, thereby perhaps making use of the power from sources 130, 132, or 134.

In this example there is a waste treatment plant 162, with a gas turbine 161. The turbine 161 turns generator 163, which supplies AC power (in this example, at 13.8 kilovolts) to the feeder 153. In this way either or both of buildings 144, 126 is able to draw upon the power from the generator 163.

To the extent that coupler 155 serves as an inverter (delivering power from DC bus 129 to feeder 153), the coupler 155 is required to be synchronous with generator 163. But neither coupler 155 nor generator 163 is required to be synchronous with the utility grid at 113 and 115.

Note that Inverter 155 is a three-wire current source, and it synchronizes to the voltage source of the 10 MW generator. It can cause current to flow, and control the phase angle of this current to produce +/−kW or VAR depending on the phase angle. A zero degree shift is kW, a 90 degree shift is VAR, and in between is a vector sum of the two. Inverter 128 is simply programmed not to allow −kW phase angles of current to flow.

Any feeder such as feeder 153 necessarily has exactly one power source that defines the voltages on the feeder (thus called a "voltage source"). Any other power sources that also deliver power to the feeder 153 are necessarily not voltage sources but are mere current sources. Thus in a typical arrangement the inverter 155 (e.g. in FIG. 8) serves as a current source and not a voltage source.

Alternatively, however, it might develop that the generator 163 might go out of service. If this were to happen, then some other power source such as inverter 155 could be reconfigured to serve as the voltage source for the bus 153. In this way, power could be delivered (see FIG. 8) from the microsite containing power sources 121, 130, 134 to a different microsite such as that of building 144 even if generator 163 were out of service.

Inverter 136 is a four-wire voltage source. It outputs three single phase voltages between phases A, B, C and N. It does this no matter what the load, up to the silicon limit of the transistors so long as the DC can be maintained within limits by whatever energy sources are feeding or taking from it.

With further reference to FIG. 8, many advantages and benefits of the invention may be appreciated.

Consider, for example, the waste treatment plant 162. In a prior-art system, such a waste treatment plant 162 might be nearly unusable because of regulatory and engineering constraints imposed by the utility company providing power at 113. In the arrangement shown in FIG. 8, however, power from the waste treatment plant 162 can pass through transformer 152 and electronics 151 to a local DC bus 150 associated with building 144. Similarly, power from the waste treatment plant 162 can pass through transformer 154 and electronics 155 to a local DC bus 129 associated with building 126. Nothing about this system requires that the power from the waste treatment plant 162 be "utility grade". It could be inaccurate in its frequency or phasing, for example, as compared with the utility grid at 113. If the power from the plant 162 is three-phase power (as it is very likely to be in most embodiments), it is no problem at all if there are unbalanced loads somewhere on the feeder 153. Even if there are unbalanced loads, the rectified power passed to DC bus 150 or 129 is capable of being put fully to use.

In FIG. 8, the electronics 128 may be configured so that the power flow is solely from left to right in FIG. 8. If so, then on a practical level the system that is to the right of electronics 128 will appear to the existing utility grid as a load reduction and not as an interconnected generator.

As mentioned above, in an exemplary embodiment the plant 162 with its generator 163 might well not be generating utility grade power. For example the power generated by the generator 163 may sometimes be of slightly higher frequency relative to specifications, and may at other times be of slightly lower frequency. There might also be unbalanced loads somewhere on the feeder 153 as between the three phases. There could also be poor-power-factor loads somewhere on the feeder 153, giving rise to a condition of the voltage and current on the feeder 153 being pulled out of phase with each other. In the face of all of these possible degradations in the quality of the power supplied on the feeder 153, it is possible to configure inverter 155 (together with local DC bus 129 and energy storage 133, 132) to bring about substantial improvements in the power quality on the feeder 153, as will now be discussed.

In an exemplary power-quality-enhancement approach, inverter 155 draws power from feeder 153 from time to time, some of which is stored in energy storage 133, 132. The power drawn need not be power of high quality since it will be rectified anyway on its way to storage 133, 132 (passing over DC bus 129). Inverter 155, however, also monitors the instantaneous voltages present on the three (typical) phases of the feeder 153. If inverter 155 notices an imperfect voltage waveform on one of the phases, including timing issues of the waveform that diverge from the desired frequency regulation, then it nearly instantaneously pumps some power into that phase (or draws power from that phase) so as to bring the waveform closer to the ideal. The availability of power on the desired time scale—far faster than the reaction time of the mechanical throttle on generator 134—is achieved through the energy storage device 132. This activity by the inverter 155 is carried out upon each of the three phases and can result in the effective waveforms on the phases of the feeder 153 being utility-grade quality.

In this arrangement, the generator 163 serves as a voltage source, while inverter 155 serves as a three-wire power source (or sink) for the purpose of dynamic frequency stabilization.

The power quality issues that are voltage related can be solved by various forms of VAR control or harmonic filtering, but that will not fix a frequency problem, which can only be fixed by changing net kW flow from an energy source. It is not correct to say that the inverter 155 sinks or sources current (which a D-VAR does as well); it sinks or sources power (kW), which it gets or sends from the energy storage source.

On a practical level this could mean, among other things, that the power provided to other end users on the feeder 153 can be sold at a price that is appropriate for utility-grade power (typically a retail price). In contrast, had the generator 163 been connected in a prior-art fashion directly to a utility grid such as at 115, the power would only be able to be sold at much lower wholesale prices. Said differently, the availability of the hardware 155, 129, 133, 132 together with appropriate configuration permits providing frequency stability so that non-utility-grade power is rendered utility-grade, offering economic benefits.

Returning now to FIG. 8, another benefit may be seen. Consider the effect upon building 144 or 126 if the utility grid 113, 114, 115 is lost to the end users at buildings 144 and 126. In a prior-art arrangement, any local backup power generation is permitted to be connected to the building only by means of a "transfer switch". The transfer switch connects either the utility grid 115 to the building bus 146, or the local backup power such as from generator 134 or generator 163. With such an arrangement, any switching of the transfer switch will result in a disruption of power.

Some transfer switches require tens or hundreds of milliseconds to switch. But another issue is that some utilities require that the circuit "go dark" for at least hundreds of milliseconds, before the local backup power comes on line. As such, this is often a regulatory, not technical, limitation. But as mentioned above, the systems according to the invention do not suffer from such interruptions.

In contrast, however, with an arrangement 160 as shown in FIG. 8, a loss of the utility grid 115 need not result in any disruption at all of the power to the end user AC buses 146, 138. The loss of utility power merely means that electronics 148, 128 are then unable to provide DC power to the local DC buses 150, 129 respectively. But other sources of DC power permit continued and uninterrupted AC power through inverters 149, 136 to local AC buses 146, 138.

Returning again to FIG. 8, it will be appreciated that electronics 155, 128, 151, 148 can be configured to respond to out-of-band signaling that permits taking action based upon price changes among the various sources of electrical power. If a particular power source becomes more expensive, the electronics can draw less power from that source. If a particular power source becomes less expensive, then the electronics can draw more power from that source.

Any electrical power distribution system will have fault protection devices which are intended to open in the event of a fault, so as to isolate a failed portion of the system from other non-failed portions of the system. What is undesirable, however, is if in the event of a fault, the fault currents fail to rise to a level that suffices to trigger the relevant fault protection device. With appropriate configuration, however, the inverters feeding a given feeder or bus or grid can respond to internal control logic to sense voltage anomalies on the feeder or bus or grid; when this happens the inverters can supply extra current so as to help clear the relevant fault protection devices as quickly as possible.

Conclusion

The advantages of this control scheme, over other ways to perform the sharing of multiple power sources, include:

- A lower output source impedance requirement for the inverters since impedance is not required to be added to aid active power sharing. This reduces cost and efficiency loss, and increases the amount of available fault current that can be sourced from the inverters.
- A simple control scheme may be employed, with no need for active Micro-grid type controls.
- It is possible to retain redundant operation with no single-component failure able to cause a complete shutdown.

While the invention has been described with respect to particular embodiments, the invention is not limited thereto. Those skilled in the relevant arts will have no difficulty devising myriad obvious improvements and variations, all of which are intended to be within the scope of the claims which follow, when properly construed.

What is claimed is:

1. A power system comprising:

a utility grid providing AC electric power connectivity and extending geographically to a plurality of first end-user locations and to a plurality of second end-user locations;

the first end-user locations comprising more than one and less than all of the end-user locations of the utility grid;

each of the first end-user locations comprising a local bus providing AC electric power connectivity;

each local bus having associated with it at least one AC load metallically connected thereto and drawing power therefrom;

each local bus coupled by means of a respective first at least one coupler to the utility grid, the at least one coupler comprising a first power-supply-inverter and a second power-supply-inverter;

each power-supply-inverter having an AC interface and a DC interface and a controller;

each power-supply-inverter disposed in a first mode to receive DC power received at the DC interface and to generate AC power delivered at the AC interface, and disposed in a second mode to receive AC power received at the AC interface and to generate DC power delivered at the DC interface;

the DC interface of the first power-supply-inverter electrically connected to the DC interface of the second power-supply-inverter;

whereby the at least one coupler has a first AC interface defined as the AC interface of the first power-supply-inverter and a second AC interface defined as the AC interface of the second power-supply-inverter;

the controller of the first power-supply-inverter and the controller of the second power-supply-inverter coupled so as to prevent the first power-supply-inverter and the second power-supply-inverter from being in the first mode simultaneously for extended intervals, and so as to prevent the first power-supply-inverter and the second power-supply-inverter from being in the second mode simultaneously for extended intervals;

each power-supply-inverter disposed when in its first mode to generate its AC power delivered at its AC interface consistent in voltage and phase and frequency with any AC power present external to said AC interface;

the power system further comprising:

a feeder providing AC electric power connectivity and extending geographically to the plurality of first end-user locations;

each local bus coupled by means of a respective second at least one coupler to the feeder;

the feeder being unsynchronized with the utility grid.

2. The system of claim 1 wherein at least one of the first end-user locations further comprises a local power generator coupled by means of a coupler to the local bus.

3. The system of claim 1 wherein at least one of the first end-user locations further comprises a local power generator coupled by means of an inverter to the local bus.

4. The system of claim 1 wherein a local power generator is coupled by means of a coupler to the feeder.

5. The system of claim 1 wherein a local power generator is coupled by means of an inverter to the feeder.

6. The system of claim 1 wherein at least one of the first end-user locations further comprises an energy storage device coupled by means of a coupler to the local bus, the AC load of the end-user location having a level of power consumption; said energy storage device disposed to store an amount of energy exceeding at least mumble-hours of energy at the power level of the AC load.

7. The system of claim 1 wherein at least one of the first end-user locations further comprises an energy storage device coupled by means of a coupler to the local bus, the AC loads of the first end-user locations having an aggregate level of power consumption; said energy storage device disposed to store an amount of energy exceeding at least mumble-hours of energy at the aggregated power levels of the AC loads.

8. The system of claim 1 wherein at least one of the first end-user locations further comprises an energy storage device coupled by means of a power-supply-inverter to the local bus, the AC load of the end-user location having a level of power consumption; said energy storage device disposed to store an amount of energy exceeding at least mumble-hours of energy at the power level of the AC load.

9. The system of claim 1 wherein at least one of the first end-user locations further comprises an energy storage device coupled by means of a power-supply-inverter to the local bus, the AC loads of the first end-user locations having an aggregate level of power consumption; said energy storage device disposed to store an amount of energy exceeding at least mumble-hours of energy at the aggregated power levels of the AC loads.

10. A power system comprising:

a utility grid providing AC electric power connectivity and extending geographically to a plurality of first end-user locations and to a plurality of second end-user locations;

each of the first end-user locations comprising a local bus providing AC electric power connectivity;

each local bus having associated with it at least one AC load metallically connected thereto and drawing power therefrom;

each local bus coupled by means of a respective first at least one coupler to the utility grid, the at least one coupler comprising a first power-supply-inverter and a second power-supply-inverter;

each power-supply-inverter having an AC interface and a DC interface and a controller;

each power-supply-inverter disposed in a first mode to receive DC power received at the DC interface and to generate AC power delivered at the AC interface, and disposed in a second mode to receive AC power received at the AC interface and to generate DC power delivered at the DC interface;

the DC interface of the first power-supply-inverter electrically connected to the DC interface of the second power-supply-inverter;

whereby the at least one coupler has a first AC interface defined as the AC interface of the first power-supply-inverter and a second AC interface defined as the AC interface of the second power-supply-inverter;

the controller of the first power-supply-inverter and the controller of the second power-supply-inverter coupled so as to prevent the first power-supply-inverter and the second power-supply-inverter from being in the first mode simultaneously for extended intervals, and so as to prevent the first power-supply-inverter and the second power-supply-inverter from being in the second mode simultaneously for extended intervals;

each power-supply-inverter disposed when in its first mode to generate its AC power delivered at its AC interface consistent in voltage and phase and frequency with any AC power present external to said AC interface;

wherein at least one of the first end-user locations further comprises a local power generator coupled by means of an inverter or a coupler to the local bus.

11. The system of claim 10 wherein the power system further comprises:

a feeder providing AC electric power connectivity and extending geographically to the plurality of first end-user locations;

each local bus coupled by means of a respective second at least one coupler to the feeder.

12. The system of claim 10 wherein at least one of the first end-user locations further comprises an energy storage device coupled by means of a coupler to the local bus, the AC load of the end-user location having a level of power consumption; said energy storage device disposed to store an amount of energy exceeding at least mumble-hours of energy at the power level of the AC load.

13. The system of claim 11 wherein at least one of the first end-user locations further comprises an energy storage device coupled by means of a coupler to the local bus, the AC loads of the first end-user locations having an aggregate level of power consumption; said energy storage device disposed to store an amount of energy exceeding at least mumble-hours of energy at the aggregated power levels of the AC loads.

14. The system of claim 10 wherein at least one of the first end-user locations further comprises an energy storage device coupled by means of a power-supply-inverter to the local bus, the AC load of the end-user location having a level of power consumption; said energy storage device disposed to store an amount of energy exceeding at least mumble-hours of energy at the power level of the AC load.

15. The system of claim 11 wherein at least one of the first end-user locations further comprises an energy storage device coupled by means of a power-supply-inverter to the local bus, the AC loads of the first end-user locations having an aggregate level of power consumption; said energy storage device disposed to store an amount of energy exceeding at least mumble-hours of energy at the aggregated power levels of the AC loads.

* * * * *